United States Patent Office 3,480,665
Patented Nov. 25, 1969

---

3,480,665
METHOD OF PREPARATION OF BETAINE HYDRATE
Georges Nagy, Montrouge, France, assignor, by mesne assignments, to Ugine Kuhlmann (societe anonyme), Paris, France, a corporation of France
No Drawing. Filed Mar. 17, 1966, Ser. No. 535,028
Claims priority, application France, Mar. 22, 1965,
10,245; July 8, 1965, 24,003
Int. Cl. C07c *101/12*
U.S. Cl. 260—501.13      6 Claims

---

ABSTRACT OF THE DISCLOSURE

In the production of betaine by reacting trimethylamine with a monochloroacetate salt of an alkali metal or an alkaline earth metal in an aqueous medium whereby an aqueous solution results containing betaine and a reaction byproduct selected from the group consisting of alkali metal chlorides and alkaline earth metal chlorides, the process for separating betaine from the reaction byproduct comprising the steps of passing said aqueous solution over a strongly acidic cation exchange resin having a gel structure and containing, as a counter-ion, the metallic ion present in the aqueous solution, and thereafter passing water through the cation exchange resin whereby the reaction byproduct is eluted first, and then betaine.

---

Several methods of manufacturing betaine hydrate are already known. Thus, according to German Patent 611,148 of Oct. 1, 1933, a stoichiometric quantity of a solution of trimethylamine in water is added to an aqueous solution of sodium monochloroacetate and the mixture is brought to boiling point until the odor of trimethylamine disappears. The mixture is evaporated to dryness and extracted with ethanol; the betaine goes into solution while the major part of the sodium chloride remains insoluble. The solution is filtered, concentrated, and the betaine precipitated by adding a mixture of ether and acetone. The yield is practically quantitative, but the betaine obtained is impure. Sodium chloride in fact is not totally insoluble in ethanol and contaminates the product.

German Patents 348,380 and 348,381 of 1917, describe the preparation of betaine from the hydrochloride by an electrolytic process.

According to United States Patent 2,800,502, betaine hydrate is prepared by the action of a large molecular excess of trimethylamine on monochloroacetic acid. From 2 to 3 mols of trimethylamine are used per mole of monochloroacetic acid, the aqueous mixture is heated for one hour at 50–60°, and the excess of trimethylamine is then recovered by distillation. The residue is composed of a mixture of betaine and trimethylamine hydrochloride. After preliminary dilution, it is passed over a strongly basic anion exchange resin in a hydroxide cycle in order to convert the trimethylamine hydrochloride into free amine. After recovering the trimethylamine by distillation, the product is concentrated in vacuo and betaine hydrate is obtained by crystallization. This technique has various disadvantages. It utilizes a large excess of trimethylamine, which has to be recycled. The reaction mixture must be diluted before passing over the anion exchange resin, because of the necessity to operate with solutions of a concentration close to 1 N, which has the consequence of increasing the quantity of water which has to be eliminated for concentration. In addition, highly basic anion exchange resins of the quaternary ammonium type are relatively expensive, deteriorate rather rapidly in use, and may contaminate the effluent by traces of free amines or of aminated polymers of low molecular weight.

The invention proposes to provide a method of preparation of betaine hydrate which avoids these disadvantages.

The inventor's researches have enabled him to find that this result could be obtained by reacting trimethylamine with an alkali or alkaline earth metal salt of monochloroacetic acid, fixing the betaine and the alkali or alkaline earth cation on the hydrogen form of a strongly acidic cation exchange resin and selectively eluting the betaine from the resin by means of an ammonia solution. In its most general form the invention consists in reacting an alkali or alkaline earth metal salt of monochloroacetic acid on a stoichiometric quantity or slight molecular excess of trimethylamine which supplies a mixture of betaine and alkali or alkaline earth metal chloride, containing the excess of trimethylamine, when this exists, said excess being distilled off and recovered. The diluted reactional mixture is then passed over a strongly acidic cation exchange resin in a hydrogen form, whereby the alkali or alkaline earth salt is split off; the alkali or alkaline earth cation is fixed on the resin and the chloride ion passes in the form of hydrochloric acid into the effluent. When the operation is carried out with dilute solutions, the betaine is also fixed on the resin by its quaternary ammonium grouping. After the resin has been washed with water with the object of eliminating the chloride ion, the betaine is selectively eluted from the resin by a solution of ammonia used in slight excess. The product is concentrated in vacuo, driving off the ammonia, and the betaine hydrate is crystallised by cooling.

When carrying out the invention, a quantity between 1 and 1.5 mol, preferably 1 mol, of trimethylamine is used per mol of alkali or alkaline earth metal monochloroacetate. The sodium or calcium salt is preferably used. The operation is carried out in an autoclave at atmospheric pressure, by mixing the aqueous solutions of the two reagents. The reaction is slightly exothermal and the temperature rises spontaneously by 20 to 40° in one hour for a dilution of the order of 800 ml. of solution per mol of monochloroacetic acid. Heating is continued for 1 to 2 hours more at a temperature between 50 and 100°, preferably between 50 and 60°, and, if necessary, the excess of trimethylamine is distilled off and recovered.

After dilution, the solution containing the betaine and the alkali or alkaline earth metal chloride is passed over a strongly acidic cation exchange resin in the hydrogen form. The operation is carried out with solutions having a chloride ion concentration between 0.06 and 1 N, preferably between 0.20 and 0.40 N.

The resin used may be a commercial resin, such as "Dowex 50," manufactured by Dow Chemical Co., "Amberlite IR–120," manufactured by Rohm and Haas, or "Nalcite HCR–W" manufactured by National Aluminate Corp. The standard X–8 qualities, cross-linked with 8% of divinylbenzene are preferably used. It is known that the total exchange capacity of a resin decreases in proportion as the concentration increases. As this effect is particularly pronounced in the case of betaine, it is advantageous to work with fairly high dilutions; for example, for a 0.3 N solution of betaine and a 0.3 N solution of sodium chloride the exchange capacity is 1.65 equivalent of betaine and sodium per litre of "Dowex 50 X–8" resin, present entirely in the hydrogen form. The practical exchange capacity is 1.40 equivalent per litre of resin for a regeneration level of 4.5 equivalents of acid per litre of resin.

The betaine is retained less strongly on the resin than the alkali or alkaline earth cations. The result is that when passing over the column these cations prograssively replace the betaine which is already fixed, and this chromatographic separation has the result that at saturation point the cations and the betaine occupy fairly well demarcated zones. The chromatographic separation resulting from the difference of selectivity leads to a particular form of execution of the process according to the invention. According to this characteristic of the invention the resin column which is traversed by the dilute solution is divided into two parts, which have respective volumes such that at the end of the percolation the first column will be saturated in alkali or alkaline earth cations and the second column will be almost saturated with betaine. The latter then contains only a small proportion of alkali or alkaline earth cations fixed at the top of the column, corresponding to the difference between the total exchange capacity and the exchange capacity at the cation leakage of the first column. Only the second column is, of course, subjected to the elution by ammonia; the first passes directly to the regeneration step. The two column technique makes it possible to use more concentrated ammonia for the elution of the betaine.

It must not, in fact, be overlooked that the elution of the betaine from a resin, the sulphonic acid functions of which are saturated partly by the betaine and partly by the alkali or alkaline earth cations, is not absolutely selective. Actually the ammonia elutes not only the betaine but also traces of alkali or alkaline earth bases, the quantity of which increases with the concentration of the ammonia.

Ammonia can be used at concentrations of 0.5 N to 5 N, however it is advantageous to utilize a solution of ammonia as concentrated as possible for the elution of the betaine, in order to reduce the cost of its subsequent concentration. During the elution of the betaine the sulphonic acid functions of the resin are neutralised; this reaction is highly exothermal and the heat liberated limits the concentration of the ammonia to about 5 N. When the resin contains approximately equimolecular quantities of betaine and of alkali or alkaline earth cations, at a concentration of 4–5 N, the ammonia already elutes a considerable proportion of alkaline base.

In the alternative utilizing two columns, where the second column contains only a small fraction of the alkali or alkaline earth cations originally present, it is possible to operate with fairly concentrated ammonia, of the order of 3–4 N, without contaminating the eluted betaine by traces of alkali or alkaline earth bases.

Finally, within the scope of the invention it has been found that it was easily possible to eliminate traces of alkaline base contained in the betaine solution by passing it over a weekly acidic cation exchange resin, such as "Amberlite IRC–50." This resin selectively retains the strong bases, but allows the betaine to pass. It is possible to pass either the solution freed from ammonia over the hydrogen form, or the solution as it is over the ammonium form of the resin.

Another advantageous form of execution of the method of the invention consists of utilizing the so-called ion exclusion technique for separating the betaine from the alkali or alkaline earth metal chloride with the aid of a cation exchange resin having a gel structure and containing the same counter-ion as the metallic ion contained in the solution.

It is known that the ion exclusion method, which makes it possible to separate electrolytes from non-ionic substances, utilizes ion exchange resins having a gel structure. A column of an ion exchange resin of this type comprises three phases: the solid network of the resin beads, the liquid phase inside the beads, and the interstitial liquid. Compounds of low molecular weight diffuse freely for the most part from one liquid phase to the other; however, while the non-ionic compounds are at concentrations of the same order of magnitude in the two liquid phases, the electrolytes are excluded from the liquid phase inside the beads because of the Donnan membrane effect.

Thus, when a solution containing an electrolyte and a non-ionic substance is passed over a resin bed and then rinsed with water, the electrolyte is the first to appear in the effluent because during its passage it has had to displace only the interstitial liquid. On the other hand the non-ionic substance had to displace the interstitial liquid and the occluded liquid, so that for suitable feed and rinsing volumes it reaches the bottom of the column only after the passage of the electrolyte.

In technical literature there are to be found complete studies of the principle, the applications, and the technology of ion exclusion (see in particular the article by Bauman, Wheaton and Simpson in Nachod-Schubert: "Ion Exchange Technology" pp. 182–202 Academic Press, New York 1956).

The inventor has now found that betaine, although having a Zwitterion structure, behaved like a non-ionic substance in the exclusion of ions and that it could thus be easily separated from the alkali or alkaline earth metal accompanying it. This is an advantageous procedure, because it requires no regeneration of the resins and effects a saving of reagents and results in less wear on the resins.

According to this advantageous embodiment the method of the invention utilises a strongly acidic cation exchange resin having a gel structure, preferably on the basis of polystyrene cross linked with divinylbenzene. Use is advantageously made of commercial resins containing sulphonated groups, such as the product sold under the commercial name of Amberlite IR–120, manufactured by Rohm & Haas, the resin Dowex 50 X–8 manufactured by Dow Chemical Co., the resin Nalcite HCR manufactured by Nalco Chemical Co., and the resin Imac C 12 manufactured by Imacti. The use of resins of a fairly fine granulometry (50–100 mesh), of which the mean particle dimension is of the order of about 0.15 mm. to 0.3 mm. for example, has been found advantageous. The resin must be in the ionic form corresponding to the metallic cation of the solution.

In the case of the separation of betaine by ion exclusion, the solution containing the betaine and the alkali or alkaline earth metal chloride is introduced at the top of the column; the solution is first passed through and then rinsed with water, these operations being repeated alternately. The effluent first contains the displaced water corresponding to the interstitial volume, then alkali or alkaline earth metal chloride free from betaine, which is discarded. Then follows a contamination zone consisting of a mixture of betaine and alkali or alkaline earth metal chloride, which is recycled. At end of the cycle a practically pure betaine solution is obtained, which contains only traces of alkali or alkaline earth metal chloride.

According to another characteristic of the invention it is possible to obtain pure betaine free from alkali metal chloride by passing the previous betaine solution, containing traces of chloride, first over a strongly basic anion exchange resin in the hydroxide form, which converts the chloride into alkaline base, and then over a weakly acid cation exchange resin in a hydrogen form, which fixes the alkaline base. The solution may advantageously be passed over a single bed containing the two resins intimately mixed.

For this purpose it is possible to use commercial anionic resins such as Amberlites IRA–400 and IRA–410 manufactured by Rohm & Haas, or Dowex 1 and 2 manufactured by Dow Chemical Co., and cationic resins such as Amberlite IRS–50 manufactured by Rohm & Haas, Imac Z 5 manufactured by Imacti, or Alassion CC manufactured by Dia-Prosim.

Various examples of execution of the method according to the invention are described below.

Example 1

A solution of sodium monochloroacetate was prepared by dissolving 94.5 grams (=1 mol) of monochloroacetic acid in 100 ml. of water and adding, with cooling to 20° C. 1 mol of an aqueous solution of sodium hydroxide at the rate of 160 grams per liter. This solution was added to a solution of 59 grams of trimethylamine in 300 ml. of water. As the reaction is slightly exothermal, the temperature rose spontaneously from 18° to 38° C. in half an hour. The mixture was heated for 1 hour more at 50° C. and then at 80°, while air was bubbled through until the odor of trimethylamine disappeared.

The yield of betaine, ascertained by determination in the state of betaine periodide, was quantitative. 1.0 mol of betaine and 1.0 mol of sodium chloride were obtained.

The products were diluted to 3330 ml. in order to obtain a 0.3 M solution of betaine and a 0.3 N solution of NaCl. The solution was passed over a column charged with 1300 ml. of Dowex 50 X-8, previously regenerated in hydrogen form, with a flow rate of 2.6 liter per hour, and the product was washed until the chloride ions in the effluent disappeared.

The betaine was then subjected to elution by first passing 1 liter of 2 N ammonia, and then water over the resin, the first 1050 ml. of effluent comprising water being discarded. The neutralization front advanced progressively from top to bottom in the column; 780 ml. of pure betaine solution were first collected, and then 650 ml. of slightly ammoniacal betaine solution. The two fractions were combined and concentrated in vacuo to a syrupy consistency. Betaine hydrate was then formed by crystallization with agitation.

The betaine content of the effluent first increased rapidly, passed through a constant phase, and then decreased progressively. The concentration in dependence on the volume of the effluent represents a curve in the form of an asymmetrical bell.

For the purpose for reducing the quantity of water to be evaporated, the two dilute initial and final fractions may be passed through a second column, in which the betaine is fixed.

Example 2

3330 ml. of solution containing 1 mol of betaine and 1 mol of sodium chloride, obtained in accordance with Example 1, were passed over two columns connected in series, the first being charged with 480 ml. and the second with 820 ml. of Dowex 50 X-8 regenerated in hydrogen form, with a flow rate of 2.6 liters per hour, and the product was washed until the chloride ion disappeared.

The first column then contained only traces of betaine and it was saturated with sodium ions, whereas the second column retained all the betaine introduced. On this second column the betaine was eluted by passing 680 ml. of 2.8 N ammonia and then water. 650 ml. of water were discarded and 550 ml. of pure betaine solution and 410 ml. of ammoniacal betaine solution were collected. The product was concentrated and Crystallized as in Example 1.

Example 3

The diluted reaction mixture was passed over Dowex 50 X-8 in accordance with Example 1, and the betaine then subjected to elution by passing 500 ml. of 4 N ammonia and then water over the resin.

The eluate fraction collected contained 230 g. of betaine hydrate and 5 p.p.m. of sodium per liter. By passing over a column charged with 150 ml. of Amberlite IRC-50 in the form of ammonium, a pure solution of betaine was obtained which was concentrated and crystallized.

Example 4

A solution of calcium monochloroacetate was prepared by dissolving 94.5 g. (1.0 mol) of monochloroacetic acid into 700 ml. of water and adding 39 g. of slaked lime titrating at 0.72 CaO. This solution was added to a solution of 59 g. of trimethylamine in 240 ml. of water and the mixture was heated for 2 hours at 60°. The operation was then continued as in Example 1.

The following examples correspond to the separation of betaine hydrate and alkali or alkaline earth metal chloride by ion exclusion.

Example 5

A mixture of 1 mol of betaine and 1 mole of sodium chloride was prepared in accordance with Example 1, and this mixture was then made up to 1 liter so as to obtain a 1 M solution of betaine and of sodium chloride.

285 ml. of this solution were passed at a linear speed of 1.2 meters per hour over a column of a diameter of 50 mm. charged with 1.9 liters of Dowex 50 X-8 50-100 mesh, in sodium form, and then rinsed with water. 100 ml. fractions were collected. Determinations of the betaine and sodium chloride gave the following results.

|  | Betaine (mmol.) | NaCl (mmol.) |
| --- | --- | --- |
| Effluent (ml.): |  |  |
| 700 | 0 | 0. |
| 800 | 0 | 18 discarded. |
| 900 | 0 | 47 discarded. |
| 1,000 | 5 | 75 discarded. |
| 1,100 | 20 | 89 recycled. |
| 1,200 | 43 | 58 recycled. |
| 1,300 | 57 | 2 recycled. |
| 1,400 | 54 | Traces. |
| 1,500 | 44 | Do. |
| 1,600 | 29 | Traces collected. |
| 1,700 | 17 | Do. |
| 1,800 | 10 | Do. |
| 1,800 | 10 | Do. |
| 1,900 | 5 | Do. |
| 2,000 | 3 | Do. |
| 2,100 | 1 | Discarded. |

Example 6

The operation was similar to Example 5, but the solution was passed over the resin with a linear speed of 0.6 meter per hour.

The dosage supplied the following results:

|  | Betaine (mmol.) | NaCl (mmol.) |
| --- | --- | --- |
| Effluent (ml.): |  |  |
| 700 | 0 | 0. |
| 800 | 0 | 15 discarded. |
| 900 | 0 | 48 discarded. |
| 1,000 | 2 | 83 discarded. |
| 1,100 | 16 | 97 recycled. |
| 1,200 | 42 | 34 recycled. |
| 1,300 | 65 | 2 recycled. |
| 1,400 | 66 | Traces. |
| 1,500 | 47 | Traces collected. |
| 1,600 | 26 | Do. |
| 1,700 | 13 | Do. |
| 1,800 | 6 | Do. |
| 1,900 | 2 | Traces discarded. |
| 2,000 | 1 | Traces. |

Example 7

A mixture of 1 mol of betaine and 1 mol of sodium chloride was prepared in accordance with Example 5 and concentrated to 660 ml. so as to obtain a solution 1.5 M of betaine and of sodium chloride.

285 ml. of this solution were passed over 1.9 l. of Dowex 50 X-8 60-100 mesh, in sodium form, with a linear speed of 0.6 meter per hour, and then rinsed with water.

Analysis was effected with 100 ml. fractions and gave the following results:

|  | Betaine (mmol.) | NaCl (mmol.) |
| --- | --- | --- |
| Effluent (ml.): |  |  |
| 700 | 0 | 0. |
| 800 | 0 | 16 discarded. |
| 900 | 0 | 51 discarded. |
| 1,000 | 3 | 89 discarded. |
| 1,100 | 14 | 127 discarded. |
| 1,200 | 35 | 134 recycled. |
| 1,300 | 102 | 10 recycled. |
| 1,400 | 107 | 1 recycled. |
| 1,500 | 77 | Traces. |
| 1,600 | 51 | Traces collected. |
| 1,700 | 25 | Do. |
| 1,800 | 10 | Do. |
| 1,900 | 4 | Traces discarded. |
| 2,000 | 2 | Traces. |

What I claim is:

1. In the production of betaine by reacting in an aqueous medium trimethylamine with a monochloroacetate salt selected from the group consisting of alkali metals and alkaline earth metals whereby an aqueous solution is formed containing betaine and a reaction by-product selected from the group consisting of alkali metal chlorides and alkaline earth metal chlorides, the process for separating betaine from said reaction byproduct comprising the steps of passing said aqueous solution over a strongly acidic cation exchange resin in the alkali or alkaline earth metal form corresponding to the metallic ion present in said aqueous solution, said resin having a gel structure, and thereafter passing water through said cation exchange resin whereby said reaction byproduct is eluted first, and then betaine.

2. The process of claim 1 including the step of separately collecting said reaction byproduct fraction and said betaine fraction which have been separated by said resins.

3. The process of claim 1 wherein said cation exchange resin having a gel structure is a polystyrene cross-linked with divinylbenzene.

4. The process of claim 3 wherein said cation exchange resin having a gel structure based on polystyrene cross-linked with divinylbenzene, has sulfonic acid functional groups.

5. The process of claim 2 wherein, the preparation of betaine of high purity, the process includes the step of successively passing said collected betaine fraction over a strongly basic anionic resin in the hydroxide form and over a weakly acidic cationic resin in the hydrogen form.

6. The process of claim 2 wherein, for the preparation of betaine of high purity, the process includes the step of passing said collected betaine fraction through a mixed bed containing a strongly basic anionic resin in the hydroxide form and a weakly acidic cationic resin in the hydrogen form.

References Cited

UNITED STATES PATENTS

| 2,800,502 | 7/1957 | Vassel | 260—501.13 |
| 2,586,295 | 2/1952 | Brown et al. | 260—501.13 |
| 2,413,791 | 1/1947 | Shafor | 260—501.13 |
| 2,375,164 | 5/1945 | Bennett | 260—501.13 |

FOREIGN PATENTS

| 1,238,893 | 7/1960 | France. |
| 269,701 | 10/1912 | Germany. |

LEON ZITVER, Primary Examiner

MICHAEL W. GLYNN, Assistant Examiner